(12) United States Patent
Runels et al.

(10) Patent No.: US 8,387,926 B2
(45) Date of Patent: Mar. 5, 2013

(54) CLAMPING CAM TUBE SUPPORT

(75) Inventors: Thomas L. Runels, Battle Creek, MI (US); Troy A. Flodin, Caledonia, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 58 days.

(21) Appl. No.: 12/963,165

(22) Filed: Dec. 8, 2010

(65) Prior Publication Data
US 2012/0145839 A1    Jun. 14, 2012

(51) Int. Cl.
*E21F 17/02*    (2006.01)
*F16L 3/00*    (2006.01)

(52) U.S. Cl. ... 248/62; 248/74.4; 248/316.1; 248/230.2; 248/228.2; 248/231.31

(58) Field of Classification Search ............... 248/689, 248/231.31, 228.2, 230.2, 316.1, 316.2, 316.6, 248/316.7, 231.85, 74.1, 74.4, 62, 73, 300
See application file for complete search history.

(56) References Cited

U.S. PATENT DOCUMENTS

| | | | | |
|---|---|---|---|---|
| 2,714,497 A | * | 8/1955 | Denis ............................. | 248/62 |
| 2,955,167 A | * | 10/1960 | Spitler ......................... | 200/1 A |
| 3,076,531 A | | 2/1963 | Hanley et al. | |
| 4,417,711 A | * | 11/1983 | Madej ........................ | 248/74.4 |
| 4,445,255 A | * | 5/1984 | Olejak ............................ | 24/284 |
| 4,615,500 A | * | 10/1986 | Layson ............................ | 248/65 |
| 5,073,353 A | * | 12/1991 | Florian ........................ | 422/310 |
| 5,174,680 A | | 12/1992 | Nakamura et al. | |
| 5,316,346 A | * | 5/1994 | Maurer ........................... | 285/23 |
| 5,649,685 A | | 7/1997 | Keller | |
| 6,095,462 A | * | 8/2000 | Morgan ......................... | 248/82 |
| 6,240,806 B1 | | 6/2001 | Morris et al. | |
| 7,537,224 B2 | | 5/2009 | Morris et al. | |
| 2006/0021834 A1 | | 2/2006 | Kwasniewski | |
| 2009/0084926 A1 | * | 4/2009 | Pasqua ......................... | 248/647 |

OTHER PUBLICATIONS

Bendix Brake, Application Guidelines BW7260, Premium wheel-end brake products, Bendix Spicer Foundation Brake LLC, pp. 1-47.

* cited by examiner

*Primary Examiner* — Nkeisha Smith
(74) *Attorney, Agent, or Firm* — Crowell & Moring LLP

(57) ABSTRACT

A support arrangement, operable to clamp a cam tube for a drum brake assembly in position relative to an adjacent vehicle component, includes a first jaw having a first pair of arms, each of which has an one opening in an inclined end section, a second jaw having a second pair of arms, each of which has an opening in an inclined end section, and a base associated with the vehicle component and having a third pair of arms. Each of the third pair of arms also has an opening in its end section. Bolts or other such fastener elements are receivable within aligned sets of openings in the first, second, and third pairs of arms, permitting displacement of the first and second jaws relative to the base upon adjustment of the fasteners so that the jaws grip the tube and clamp the tube in its proper position. A clamping process is also described.

18 Claims, 3 Drawing Sheets

CLAMPING CAM TUBE SUPPORT

BACKGROUND OF THE INVENTION

1. Field of the Invention

The present invention provides a cam tube support for a drum brake assembly that can adjust to an outer cam tube diameter so that good contact is always provided between the support and the cam tube.

2. Description of Related Art

Various drum brake cam tube support arrangements are in use today. However, with typical arrangements, it is often difficult to maintain consistent contact with cam tubes when using supports designed to accommodate variations in drum brake cam tube locations. Conversely, supports that maintain consistent contact with cam tubes typically fail to permit variations in support locations.

U.S. Pat. No. 3,076,531 to Hanley et al. shows a single tubular brake support that is adjustably secured within a brake spider. The mounting is rotatable around splines of the brake spider.

U.S. Pat. No. 5,174,680 to Nakamura et al. discloses a pair of rings brought together by bolts so as to ramp together between a shaft and a wheel and provide torque transfer. Guide portions on the shaft are unnecessary, but the ramp action is strictly limited by the sizes of the shaft and the hole in the wheel.

U.S. Pat. No. 5,649,685 to Keller shows a muffler support apparatus including two members that surround a muffler tube and are clamped together. The muffler support apparatus surrounds the tube and bolts vertically.

U.S. Pat. No. 6,240,806 to Morris et al. shows a non-welded cam tube support assembly. The tube includes a support plate that resists torsional loading and provides for either inboard or outboard mountings. An inner hole of the plate is irregularly shaped to tightly engage the cam tube.

U.S. Pat. No. 7,537,224 to Morris et al. shows a cam shaft support enclosure that has a two-piece, non-welded assembly. Two brackets mate with each other by sliding over a cam tube such that movement of the cam tube is minimized. Contact with the cam tube is maintained by tabs around an opening of the assembly. The overall fastener is movable along the length of the cam tube.

U.S. Patent Application Publication 2006/0021834 to Kwasniewski shows a cam washer that cooperates with a cam tube seal lug to reduce vibration, prevent corrosion, and hold a seal in place.

SUMMARY OF THE INVENTION

Introduction of wide-based tires has resulted in increased vibration and subsequent damage to drum brake cam tube assemblies. The present invention is intended to support drum brake cam tubes in such a way as to reduce vibration that can result in this sort of damage to the cam tube assemblies, and provides an improvement over an existing part that was first designed over 30 years ago. A support according to this invention can be attached to a welded or bolted frame member, may be used either in production or as a retrofit in the field, and can be installed independent of the cam tube assembly process. The present cam tube support serves to withstand the cantilevered load of an air chamber tube assembly while accommodating a variety of tube diameters via support jaw camming. Separate tube support pieces that do not rely on splines for changing the orientation around the cam tube are used, and form a three-piece assembly that move together to improve holding of cam tubes having different diameters at different locations along those cam tubes.

According to one embodiment of the invention, a support arrangement operable to clamp a tube for a brake assembly in position relative to an adjacent vehicle component includes a first jaw having a first pair of arms, each of which has an one opening in an inclined end section, a second jaw having a second pair of arms, each of which has an opening in an inclined end section, and a base associated with the vehicle component and having a third pair of arms. Each of the third pair of arms also has an opening in its end section. Bolts or other such fastener elements are receivable within aligned sets of openings in the first, second, and third pairs of arms, permitting displacement of the first and second jaws relative to the base upon adjustment of the fasteners so that the jaws grip the tube and clamp the tube in its proper position. A clamping process is also described.

In certain embodiments of the invention, the jaws have respective solid central recurved portions interconnecting the arms of the jaws and forming part-elliptical or part-circular recesses between the jaw arms. The inclined end sections of the jaws are bent relative to these central portions to provide the jaws with a camming action as the fasteners are tightened. The openings in the jaws and the base are preferably configured as oblong slots, and, when the arrangement is assembled, the oblong jaw slots have longer dimensions extending in directions that are not the same as directions in which longer dimensions of the oblong base slots extend.

DETAILED DESCRIPTION OF THE INVENTION

Figures 1, 2, 3:
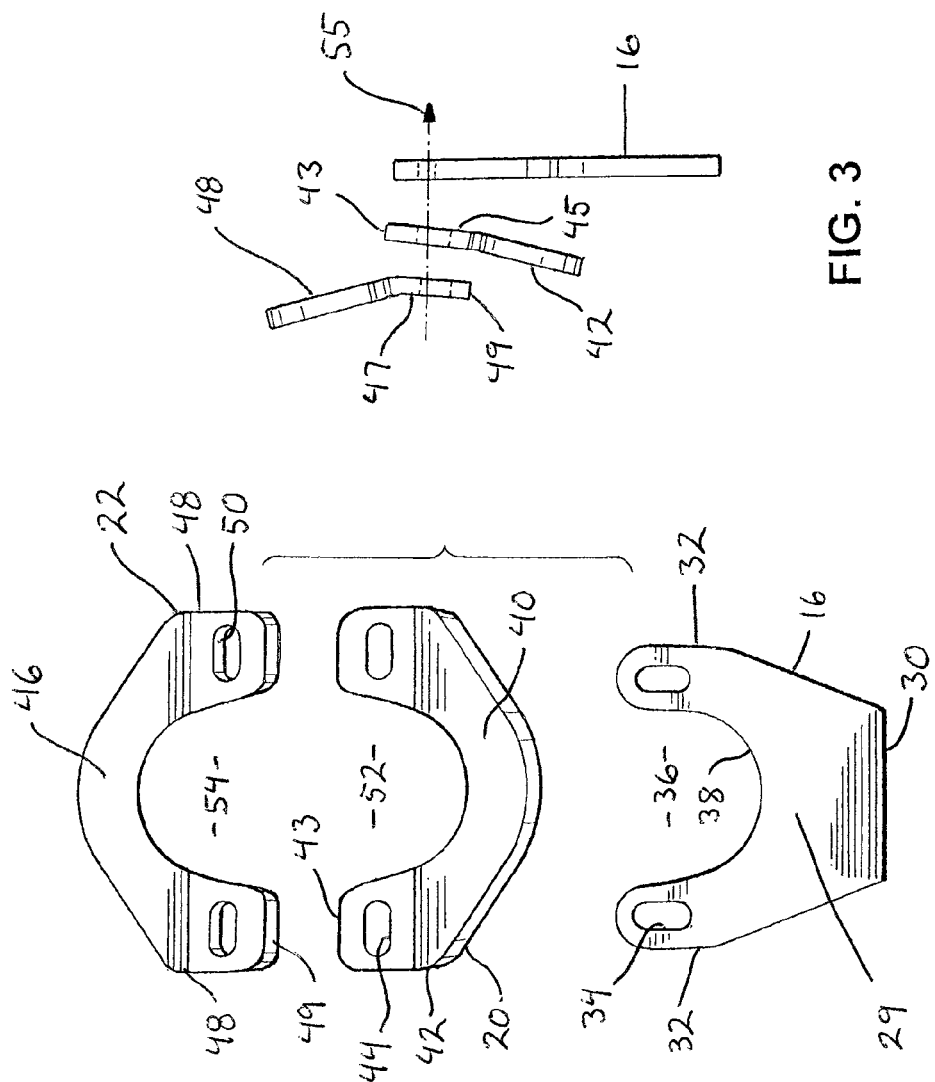
FIG. 1 is a side view of a cam tube support fully clamping a partially illustrated cam tube in position relative to an associated vehicle component.
FIG. 2 is a front exploded view of certain components of the support shown in FIG. 1.
FIG. 3 is a side view of the components shown in FIG. 2.

The side view provided by FIG. 1 shows a partially illustrated cam tube 10 as fully clamped in position relative to an axle tube or other such unsprung vehicle component 12, such as a suspension arm or other linkage, by a clamping cam tube support 14. In one preferred configuration of the invention, when the cam tube 10 is mounted in position in a car, truck, or other such vehicle, a rotatable cam shaft (not shown) extends through the cam tube 10 to interconnect a fluid brake actuator and slack adjuster arrangement with a drum brake cam, which is operable to expand drum brake shoes apart in a known manner. Such cam shafts are disclosed, for example, in the Hanley et al. ('531), Morris et al. ('806), and Morris et al. ('224) patents mentioned above as well as the Kwasniewski ('834) publication mentioned above. The entire disclosure of each of the Hanley et al. ('531), Morris et al. ('806), and Morris et al. ('224) patents mentioned above, and the entire disclosure of the Kwasniewski ('834) publication mentioned above, are incorporated herein by reference as non-essential subject matter.

The clamping cam tube support 14 is composed of three primary parts, including a base 16 secured by welds 18 or in any other suitable manner to the unsprung vehicle component 12, an approximately U-shaped lower jaw 20, and an approximately U-shaped upper jaw 22. As illustrated in the exploded plan view of FIG. 2, the base 16 has an approximately Y-shaped configuration, but the base 16 could take other forms, and could be U-shaped as well. When the clamping cam tube support 14 is in use, a pair of threaded bolts 24 may pass through aligned slots in the legs of the base 16 and the jaws 20 and 22. Cooperating nuts 26 may be tightened onto the ends of the bolts 24 to secure the base 16 and jaws 20 and 22 together, thereby fastening the cam tube 10 to the vehicle component 12.

FIG. 2 provides an illustration of the base 16 and the jaws 20 and 22 in an exploded plan view. The base 16 is shown as having a central section 29 with a mounting surface 30, adapted to be secured on a corresponding surface of the component 12 by the welds 18. The base 16, of course, could be attached to the component 12 in another suitable way or integrally formed with that component. The base 16 also has a pair of upstanding extensions defining arms 32. Each arm is provided with an oblong slot opening 34, with the longer dimension of the opening oriented roughly vertically. The term "vertically" is used here and elsewhere in this specification in a non-limiting manner, and, here, refers to a direction in which the arms 32 extend away from the central section 29. A recess 36 defined between the arms 32 of the base has a circumferential wall 38 with a contour matching the contour of the outer surface of the cam tube 10.

The lower jaw 20 is shown in FIG. 2 as having a solid central recurved portion 40 and a pair of arms 42. Each arm 42, near its end 43 distal the central portion 40, has an oblong slot opening 44, with the longer dimension of the opening oriented roughly horizontally. The term "horizontally" is used here and elsewhere in this specification in a non-limiting manner, and, here, refers to a direction approximately perpendicular to the direction in which the arms 42 extend away from the central portion 40.

The upper jaw 22 has a configuration that is similar to that of the lower jaw 20, and has a solid central recurved portion 46 and a pair of arms 48. Each arm 48, near its end 49 distal the central portion 46, has an oblong slot opening 50, with the longer dimension of the opening oriented roughly horizontally, similarly to slot openings 44. When the clamping cam tube support 14 is in use, the jaws 20 and 22 are oriented such that each arm end 43 is adjacent a corresponding arm end 49, and the central portions 40 and 46 are located away from each other. A recess 52 defined between the lower jaw arms 42 is surrounded by a circumferential wall with a contour matching the contour of the outer surface of the cam tube 10, while a recess 54 defined between the upper jaw arms 48, similarly, is surrounded by a circumferential wall with a contour matching the contour of the cam tube outer surface.

The base 16 and the jaws 20 and 22 are shown in FIG. 3 in an exploded side view. It is apparent from FIG. 3 that each lower jaw arm 42 has an inclined or canted section 45 adjacent its end 43, and that each of the openings 44 is disposed in one of the inclined or canted sections. Each upper jaw arm 48, similarly, has an inclined or canted section 47 adjacent its end 49, with each of the openings 50 disposed in one of the inclined or canted sections 47. The sections 45 and 47, as shown, are inclined at approximately 15-20 degrees relative to the remainder of the respective jaw arm, but the amount of inclination shown is not to be considered limiting in any way. Although "camming" would be produced at any inclination angle in the 1-89 degree range, the range of preferred inclination angles is important due to load. Increasing the sizes of the openings 34, 44, and 50 would allow a wider range of angles.

The amount of inclination provided to sections 47 can be varied as required to provide more, or less, clamping force to the barrel of the cam tube 10. In conjunction, as the angle of inclination increases, so must the size of the openings 44 and 50 be varied to accommodate insertion of the bolts 24 when the jaws are in a vertical position while remaining small enough to prevent the head of the bolt 24 and the nut 26 from passing through the openings when tightened. The clearance of the jaws 20 and 22 relative to the tube 10 will determine the travel of the jaws to the clamping position and, in combination with the angle of inclination, will determine the amount of clamp force that is developed.

When different cam brackets are installed, they will always be in slightly different locations because of common variations in the manufacturing process. The two-direction slots allow the clamping tube support to function even with this variation in tube locations. The horizontal slots in jaws 20 and 22 accommodate variation in the horizontal direction, while the vertical slots in the base 16 accommodate variation in the vertical direction. When assembly of the three parts comes together with bolts, the sets of slots allow the support to always "center-up" on the cam tube and achieve a good clamp. The support can also be disassembled and re-used as many times as necessary, avoiding the need to cut known support arrangements off the axle and the associated need for re-welding when a new cam bracket is installed.

Figure 4:
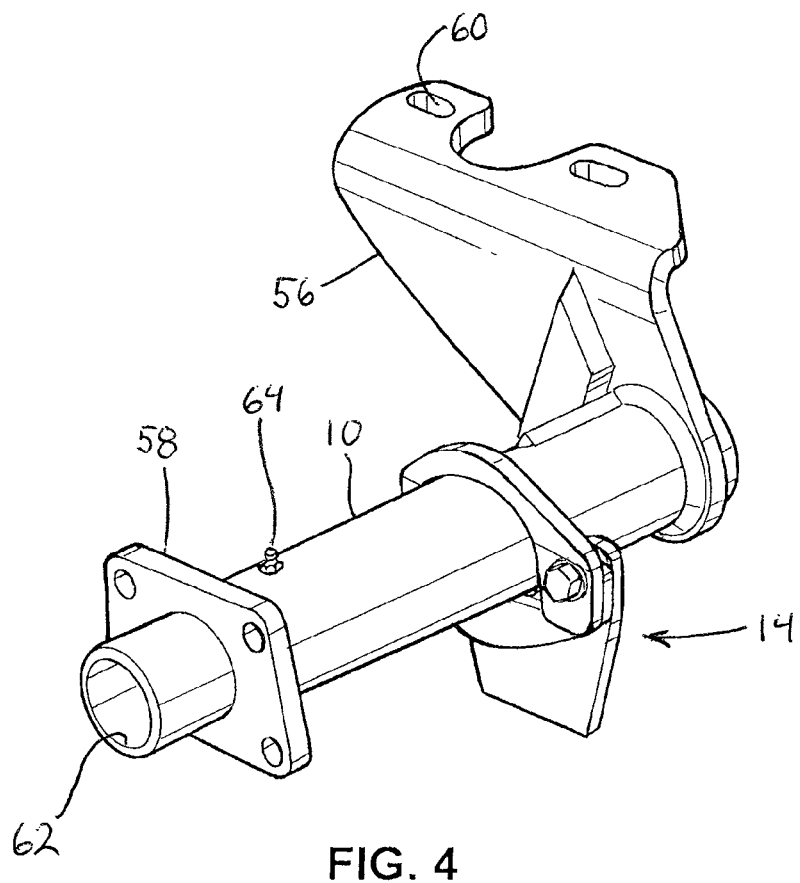
FIG. 4 is a more comprehensive, perspective view of the cam tube and certain associated parts.

FIG. 4 is a more comprehensive view of the cam tube 10 and certain parts associated therewith. FIG. 4 shows the tube 10 in a clamped condition, after the support 14 has been securely clamped onto the outer surface of the cam tube in a manner to be described. It is to be understood that the base 16 must be welded to the relevant vehicle component 12 (not shown in FIG. 4) before clamping can take place. The cam tube 10 shown in FIG. 4 extends from a bracket 56, securable to an axle housing or other unsprung vehicle structure by bolts receivable in holes 60, to an attachment flange 58, securable to a drum brake spider, backing plate, or other such element. The rotatable cam shaft (not shown) protrudes in a conventional manner through the cam tube end opening 62 and positions the drum brake cam thereon between drum brake shoe ends for brake actuation. FIG. 4 also illustrates a fitting 64 by which grease or another lubricant may be supplied to the interior of the cam tube 10 to lubricate cam shaft bushings provided for the cam tube.

The clamping tube support 14 may be used in several ways to secure the tube 10 in position relative to the component 12. One such way is now described with reference to FIGS. 1-3, and 5. The pair of slot openings 44 in the lower jaw arms 42 and the pair of slot openings 50 in the upper jaw arms 48 are aligned, and the shafts of a pair of bolts 24 are passed through the aligned slot openings 44 and 50 in a direction indicated by an arrow 55 in FIG. 3. Ends of the bolt shafts are then passed through the slot openings 34 provided in the arms 32 of the base 16, and the nuts 26 are threaded onto the ends of the bolt shafts and tightened to secure the base 16 and jaws 20 and 22 together. As the nuts are tightened, the head of each bolt 24 and a respective one of the nuts 26 are displaced toward one another. Due to the presence of the inclined jaw arm sections 45 and 47, as the nuts 26 are tightened, the lower jaw 20 tends to pivot clockwise in the direction indicated by an arrow 66 in FIGS. 1 and 5, and the upper jaw 22 tends to pivot counterclockwise in the direction indicated by an arrow 68. As the jaws 20 and 22 move in this way, edges of the circumferential walls surrounding the jaw recesses 52 and 54 frictionally engage or actually dig into the outer barrel surface of the cam tube 10, thereby securing the tube 10 in position relative to the component 12. The camming or lever action provided as the nuts 26 are tightened allows the jaws to self-center and tightly clamp onto the cam tube so that vibration, which could damage the cam tube assembly, is reduced. Although the two jaw parts try to separate, the slot openings are designed in such a way that jaw separation is limited, and the jaws bite down on the cam tube barrel as the parts get tighter. The present invention permits relative movement between the jaws and the cam tube along the length of the cam tube before clamping, and is constructed such that adequate contact is maintained with the cam tube by the camming action produced by the support base and jaw configurations after clamping occurs and the relative movement mentioned is prevented.

Figure 5:
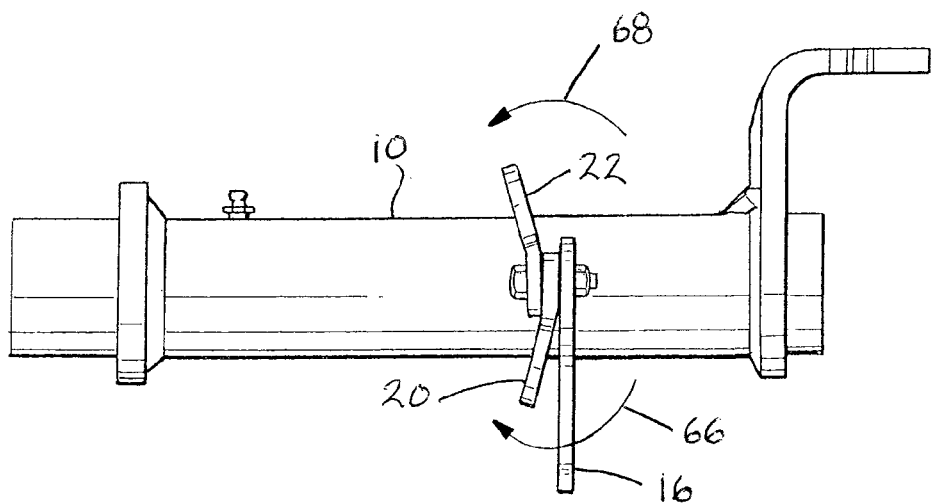
FIG. 5 is a side view of the structure shown in FIG. 4.
Figure 6:
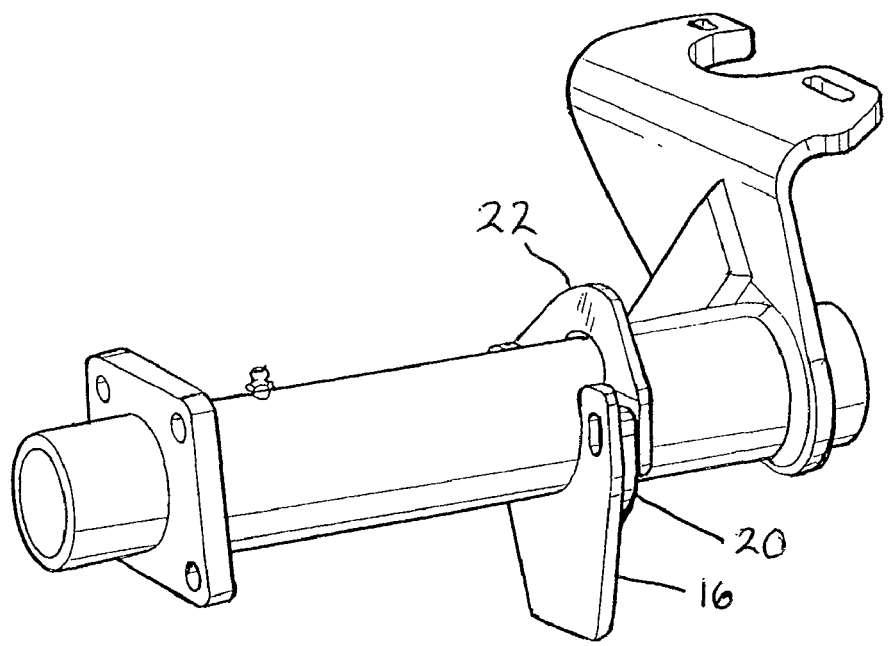
FIG. 6 is a perspective view similar to FIG. 4, but showing certain components of the cam tube support in alternative positions.

A comparison of FIGS. 5 and 6 illustrates that the jaws 20 and 22 are securable to either side of the base 16. The jaws 20 and 22 thus may be oriented so as to face in either cam tube axial direction, making attachment of the cam tube 10 to the component 12 exceptionally easy.

Figure 7:
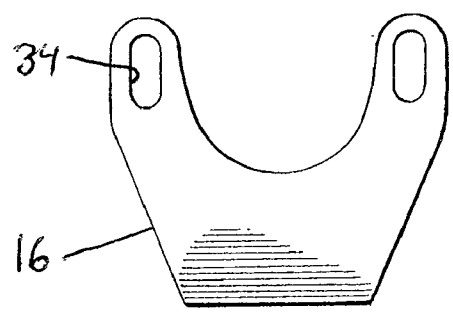
FIG. 7 is an enlarged plan view of the base of a cam tube support according to the invention.
Figure 8:
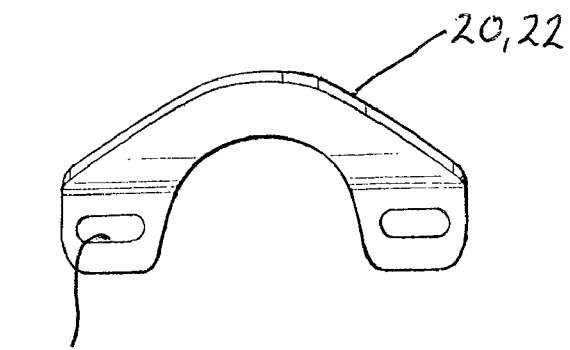
FIG. 8 is an enlarged plan view of a jaw of the cam tube support according to the invention.

FIG. 7 is an enlarged plan view of the base 16 illustrating the arrangement of the oblong slot openings 34 in the base arms 32, while FIG. 8 is an enlarged plan view of either the lower jaw 20 or the upper jaw 22, illustrating the arrangement of the oblong slot openings 44 or 50 in the arms 42 or 48, respectively. It is evident that, to produce the jaws 20 and 22 most efficiently, they should have essentially the same configuration. By orienting the oblong slot openings 34 in the arms of the base 16 "vertically" and the slot openings 44 and 50 in the arms of the jaws 20 and 22 "horizontally," appropriate positional adjustment of the jaws 20 and 22 with respect to both the cam tube 10 and the base 16 is facilitated. Orienting the slot openings 44 and 50 horizontally, as illustrated, serves to limit relative movement of the jaws to ensure tight and secure engagement of the of the circumferential walls surrounding the recesses 52 and 54 and the outer surface of the cam tube 10.

It is conceivable to configure the invention such that it has a single piece jaw instead of two jaws. The U-shaped upper jaw 22, for example, could alone be used to secure the tube 10 to the base 16 and provide clamping.

Although the use of steel as a jaw material is contemplated, the jaws 20 and 22 could be made of any of a variety of materials. The slot openings 34, 44, and 50, and the recesses 36, 52, and 54, could be formed by way of any of a variety of processes, such as stamping or cutting by water jet or laser, or a combination of such processes. Selection of the bend angle to get the best clamping action may be necessary, depending on the particular environment in which the invention is utilized. The "arch" that actually contacts the barrel could be an elliptical shape that contacts the barrel in the flatter section, or a simple part-circular shape that contacts the barrel mostly at the top when in position. Recesses shaped to accommodate other barrel shapes, such as barrels having square cross sections, are also contemplated.

By way of the present invention, a cam tube support, adjustable to accommodate various tube diameters, is provided. The slot configuration of the three-piece device allows jaw position adjustment both horizontally and vertically, permitting accommodation of variations in tube diameter and providing for various tube support locations. Pieces of the device are structured so that the support can face either axial direction of the tube, providing additional mounting configurations. As the three support pieces are fastened together in a simple manner with two bolts, no welding is necessary, and manufacturing can be simplified. The base 16 can be pre-welded and attached to the vehicle component 12 without the need to precisely locate the base 16 on the component 12. By having the cam tube support pieces wedge or cam together when the mounting bolts are tightened, secure contact with the cam tube is provided, and vibrations are reduced. The present invention thus provides varied mountings utilizing a simple design, with three main pieces holding the relevant vehicle component and the cam tube in proper relative position. The invention allows for multi-axis variations in location, and consistent contact is maintained when a cam tube is installed.

The cam tube support adjusts to location and tube diameter in such a way that it always provides adequate contact between the support and the cam tube. Clamping is accomplished by having one or two clamping members provide adequate clearance for easy installation. As a final adjustment, the clamping members self-center and tightly clamp onto the cam tube because of the cam or lever action caused by the shapes of the clamping members. The invention can be installed on new equipment or retrofit in the field, is attachable to a welded or bolted support leg, and accommodates significant variation in tube diameter and location.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A support arrangement that is operable to clamp a tube for a brake assembly in position relative to an adjacent vehicle component, comprising:
    a jaw having a first pair of arms, each arm of said first pair of arms having at least one opening in an inclined end section thereof that is inclined with respect to a remainder of that arm,
    a base associated with said vehicle component and having another pair of arms, each arm of said other pair of arms having at least one opening in an end section thereof, and
    fasteners receivable within aligned sets of openings in the pairs of jaw and base arms,
    wherein adjustment of the fasteners presses the inclined end sections of the first pair of arms against the base to pivotally displace the jaw relative to the base to grip the tube and clamp the tube in position relative to the vehicle component.

2. The support arrangement of claim 1, wherein the jaw has a solid central recurved portion interconnecting the arms of the jaw and forming a recess between the arms of the jaw.

3. The support arrangement of claim 2, wherein the recess is configured as part of an ellipse.

4. The support arrangement of claim 2, wherein the recess is part-circular.

5. The support arrangement of claim 1, wherein the openings in said jaw are configured as oblong slots.

6. The support arrangement of claim 1, wherein the openings in said base are configured as oblong slots.

7. The support arrangement of claim 5, wherein the openings in said base are also configured as oblong slots, and wherein the oblong jaw slots have longer dimensions extending in directions that are not the same as directions in which longer dimensions of the oblong base slots extend.

8. The support arrangement of claim 1, wherein the fasteners include bolts and nuts receivable on shafts of the nuts.

9. The support arrangement of claim 2, wherein the inclined end sections of the jaw are bent relative to said central recurved portion to provide the jaw with a camming action as the fasteners are tightened.

10. A support arrangement that is operable to clamp a tube for a brake assembly in position relative to an adjacent vehicle component, comprising:
- a first jaw having a first pair of arms, each of said first pair of arms having at least one opening in an inclined end section thereof,
- a second jaw having a second pair of arms, each of said second pair of arms having at least one opening in an inclined end section thereof,
- a base associated with said vehicle component and having a third pair of arms, each of said third pair of arms having at least one opening in an end section thereof, and
- fasteners receivable within aligned sets of openings in the first, second, and third pairs of arms,
- wherein adjustment of the fasteners displaces the first and second jaws relative to the base to grip the tube and clamps the tube in position relative to the vehicle component.

11. The support arrangement of claim 10, wherein the jaws have respective solid central recurved portions interconnecting the arms of the jaws and forming recesses between the arms of the jaws.

12. The support arrangement of claim 11, wherein at least one of the recesses is configured as part of an ellipse.

13. The support arrangement of claim 11, wherein at least one of the recesses is part-circular.

14. The support arrangement of claim 10, wherein the openings in said jaws are configured as oblong slots.

15. The support arrangement of claim 10, wherein the openings in said base are configured as oblong slots.

16. The support arrangement of claim 14, wherein the openings in said base are also configured as oblong slots, and wherein the oblong jaw slots have longer dimensions extending in directions that are not the same as directions in which longer dimensions of the oblong base slots extend.

17. The support arrangement of claim 10, wherein the fasteners include bolts and nuts receivable on shafts of the nuts.

18. The support arrangement of claim 11, wherein the inclined end sections of the jaw are bent relative to said central recurved portions to provide the jaws with a camming action as the fasteners are tightened.

* * * * *